Nov. 26, 1968    G. K. B. HEROLD    3,413,042
BRAKE BALANCING VALVE WITH BRAKE TARE COMPENSATING MEANS
Filed March 30, 1967
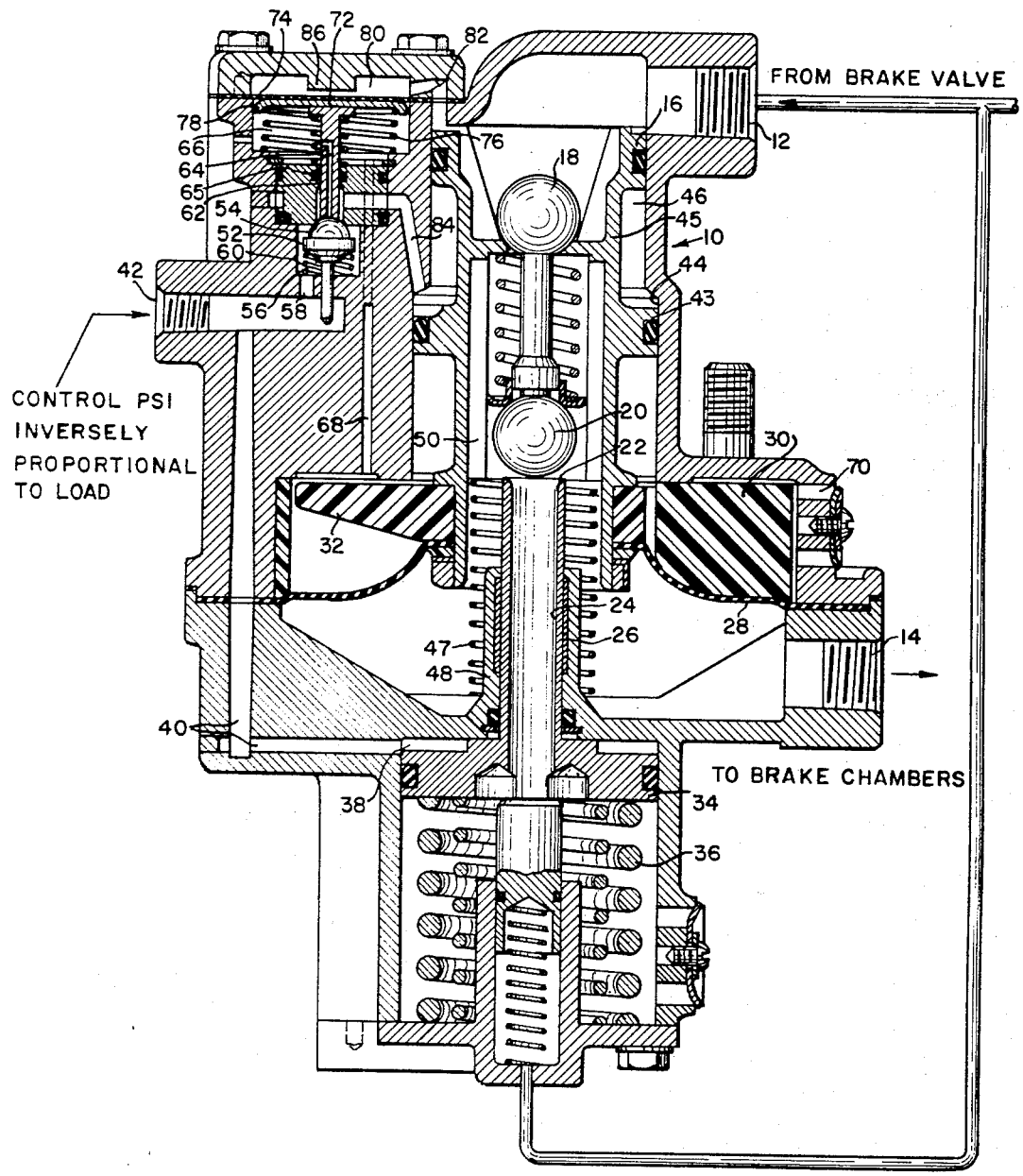
INVENTOR
GUENTER K.B. HEROLD
BY
Scrivener Parker Scrivener + Clarke
ATTORNEYS United States Patent Office 3,413,042
Patented Nov. 26, 1968

3,413,042
BRAKE BALANCING VALVE WITH BRAKE
TARE COMPENSATING MEANS
Guenter K. B. Herold, Elyria, Ohio, assignor to Bendix-Westinghouse Automotive Air Brake Company, Elyria, Ohio, a corporation of Delaware
Filed Mar. 30, 1967, Ser. No. 627,203
4 Claims. (Cl. 303—60)

ABSTRACT OF THE DISCLOSURE

A load proportioning brake valve wherein brake valve pressure acting on a constant area piston is balanced against brake chamber pressure acting on a diaphragm whose effective area is varied with vehicle load, an added constant effective area to which is applied pressure inversely proportional to load to act in concert wtih the brake valve pressure acting on the constant area piston, the added pressure serving to overcome brake tare, the invention which comprises means for applying and releasing pressure to and from the added area simultaneously with the application and release of brake valve pressure to and from the constant area piston.

*Detailed description*

This invention relates to brake balancing valves and more particularly to that type of balancing valve wherein brake valve pressure acting on a constant area piston is balanced by brake chamber pressure acting on a variable diaphragm whose effective area, and hence delivered braking pressure, is a function of vehicle load.

Brake proportioning valves of the type to which the present invention relates are well known and are shown, for example, in the prior patent to Valentine No. 3,228,731. In this type of valve, where a vehicle is lightly loaded so that brake valve pressure exceeds by a wide margin the pressure delivered by the proportioning valve to the brake chamber, the delivery pressure, which is properly proportioned according to load, e.g. on the order of 3 p.s.i. may be so low that it is sufficient to overcome brake tare, which is defined as the inherent resistance to movement of brake apparatus from brake release to the point of brake impending and may require a 5 p.s.i. delivery pressure merely to overcome the tare force. Where the properly proportional delivery pressure is less than brake tare or even where it exceeds the tare, it can be seen the effective braking of the proportioned brakes is always decreased by the effort required to overcome tare. This problem having been recognized, a solution had been proposed wherein an added are subjected to pressure inversely proportional to load acts in concert with the brake valve pressure acting on the constant area piston. The force on the added area served to overcome the force of brake tare so that the properly proportioned brake chamber pressure over and above the tare pressure is available to apply the proportioned brakes to their axles with their proper effective braking effort for the load on the vehicle, undiminished by brake tare. This solution efficiently overcame the problem of brake tare but because tare compensating control pressure was constantly applied to the added area, it was possible to trap residual pressure in the brake chambers or to retard the release of this pressure from the chambers.

It is the broad object of the present invention to overcome the foregoing problem by providing means for applying and releasing tare compensating control pressure to and from the added area simultaneously with the application and release of brake valve pressure to and from the constant area piston whereby tare compensating pressure cannot be trapped in the brake chambers between brake applications or delayed in its release from the chambers.

Other objects and their attendant advantages will become apparent as the following detailed description is read in conjunction with the accompanying single figure disclosing a vertical cross-sectional view of a brake proportioning valve incorporating the features of the present invention.

Referring now to the drawings, the numeral 10 indicates a valve casing having an inlet port 12 connected to a conventional brake valve and a delivery port 14 connected to brake chambers subject to proportioning in accordance with vehicle load.

Because the principal elements of the brake valve shown herein have been described in prior patents mentioned above the operation of the same features will be only briefly described herein. As seen the proportioning valve includes a hollow, constant area piston 16 subjected to brake valve pressure and carrying a combined inlet and exhaust valve 18, 20 with the exhaust valve 20 being moved to closed position upon engagement with an exhaust valve seat 22 surrounding the upper end of an exhaust valve passage 24 in a variably positionable hollow plunger 26 which is positioned downwardly from the position shown, which is its vehicle loaded position, in accordance with vehicle load, with the exhaust valve seat partaking of its lowermost position when the vehicle is empty.

Connected to the constant area position 16 is a variable area diaphragm 28 whose effective motive area is determined by the amount of diaphragm which is stripped away from fixed inwardly extending fingers 30 by movable outwardly extending fingers 32 carried by the constant area piston 16. This amount is determined by the position of the exhaust valve seat 22, it being apparent that when the latter is in its lowermost position the diaphragm is stripped entirely clear of the fixed fingers by the movable fingers before the inlet valve can open and thus the entire cross-sectional area of the diaphragm is subjected to pressure in the brake chamber with a much lower brake chamber pressure balancing the much higher brake valve pressure acting downwardly on the upper end of the fixed area position as those skilled in this art fully understand.

In the embodiment of the valve illustrated herein, the positioning of the exhaust valve seat 22 in accordance with load is effected by a control piston 34 which is subjected on opposite sides to the opposing forces of a control pressure acting downwardly on the piston on one side thereof and graduating springs 36 acting upwardly on the piston in the opposite direction.

The control pressure chamber 38 receives control pressure by way of conduits 40 in the casing 10 connected to a control port 42 which receives control pressure from suitable load sensing valve means capable of delivering control pressure inversely proportional to vehicle load to the control port 42. Thus, where the load in the vehicle is light, relatively high control pressure is delivered to the port 42 to move the control piston 34 substantially to its lowermost position whereas when the vehicle is heavily loaded the control pressure is low and is insufficient to move the control piston against the graduating springs 36 and the parts of the valve take the position of the drawing wherein there is no brake pressure proportioning action, or, in other words, when the parts of the valve are in the position of the drawing the ratio of brake valve pressure to brake chamber pressure is 1:1. The valve shown provides added area means to which pressure inversely proportional to load is applied in order to compensate for brake tare. The added area is afforded by a piston part 43 received in a bore 44 of greater diameter than the piston 16 and connected thereto by a reduced diameter part 45 which defines with the valve casing a control cavity 46 whose lower wall is defined by the upper annular face of piston 43 and has a greater effective area than its upper wall defined by the lower annular face of the fixed area piston 16. When supplementary control pressure inversely proportional to load is admitted constantly to cavity 46 there is a net force tending to move the piston 16 and combined inlet and exhaust valves 18, 20 downwardly to a brake applied position and where the supplementary pressure is of sufficient magnitude the piston 16 and valves 18, 20 are in fact moved downwardly until the exhaust valve is closed and even though it may thereafter be opened temporarily immediately following release of a regular brake application, the exhaust valve returns to closed position when brake chamber pressure falls to the preselected tare pressure which may be on the order of 5 p.s.i. Under some conditions, the inlet valve 18 may lap the exhaust valve 20 thus trapping 5 p.s.i. in the brake chamber. On the other hand, if the inlet valve opens while the exhaust valve remains closed the only escape for the 5 p.s.i. tare pressure in the brake chamber is through the exhaust port in the brake valve rather than through the exhaust port in the proportioning valve. Thus where there is a constant presence of supplementary control pressure in the cavity 46 the undesirable results of trapped brake chamber pressure or delayed release may occur and the purpose of the present invention is to eliminate these possibilities by providing means for connecting the supplementary control cavity 46 to atmosphere at all times except when application pressure is applied to the constant area piston 16 from the brake valve. Thus when the brakes are released the supplementary control means has no effect whatever on the valve and it functions exactly as if the control means were not a part thereof; that is to say, upon brake release the pistons 16, 43 and valves 18, 20 are returned to their positions of the drawing through the medium of a spring 47 operating between the lower end of a guide 48 for the exhaust plunger 26 and the lower end of inwardly extending valve guide flutes 50 provided on the interior of the hollow piston 16. It will be noted that with the parts in this position the exhaust valve 20 is spaced above the exhaust valve seat 22 and the brake chambers are thus connected to atmosphere during periods of brake release.

The means for admitting and exhausting pressure to and from the cavity 46 comprise a control valve member 52 which is normally urged to its closed position against a control port 54 by means of a spring 56. The underside of the valve 52 is at all times connected with control pressure by means of a passage 58 interconnecting the control port 42 and a valve chamber 60 as shown in the drawing. The valve 52 is moved to open position by means of an exhaust plunger 62 slidably received in an air seal 65 having a central exhaust passage 64 therein opening into a control valve exhaust chamber 66 which is at all times in communication with atmosphere by way of a vertical exhaust passage 68 leading into the space above the diaphragm 28 and which is connected with atmosphere by way of exhaust ports 70.

The plunger 62 is connected at its upper end to a follower 72 slidably received in the upper end of the control valve exhaust chamber 66. The follower 72 is urged upwardly against a diaphragm 74 by a spring 76 interposed between a shoulder at the lower side of the exhaust chamber 66 and an annular flange 78 on the follower 72. The upper side of the diaphragm 74 defines the lower wall of a pressure chamber 80 which is connected by way of a passage 82 with the inlet port 12 leading to the brake valve. Thus, when the brake valve is open fluid pressure immediately flows through the port 12 to act on the piston 16. Simultaneously fluid pressure flows through the passage 82 and into the chamber 80 where it acts downwardly on the diaphragm to move the plunger 64 tightly against the control valve 52, first closing off the exhaust passage 64 and thereafter moving the control valve to open position whereupon control pressure, as established by vehicle load, flows from the port 42 through the passage 58 and valve chamber 60, the control port 54 and passages 84, into supplementary control cavity 46 where it acts downwardly on the added area piston 43 to commence supplementing the force on piston 16 to a magnitude such that at approximately 5 p.s.i. pressure on the piston 16 the summation of the piston 16 and 43 forces will balance a 5 p.s.i. pressure on the variable diaphragm area, irrespective of the positioning of the exhaust seat 22, as established by the pressure in cavity 38 or indirectly the vehicle load, and cause a 5 p.s.i. delivery pressure to the brake chambers, which is the pressure required to overcome brake tare. Thereafter, any increase in pressure at the inlet port 12 is reflected in a proportioned pressure in the brake chamber over and above the tare pressure and which is applied to effective braking effort in accordance with the load on the axle served by the brake chamber.

When the brake valve is moved to its brake release position whereby the service line is connected to atmosphere, as is also the inlet port 12 and the chamber 80 above the control diaphragm 74, the spring 76 operates on the follower 72 and the diaphragm to move the plunger 62 upwardly to effect, first, closing of the control valve 52 and thereafter opening of the lower end of the exhaust passage 64 so that any pressure in the supplementary control cavity 46 is thus connected to atmosphere by way of the passages 84, the exhaust passage 64, the exhaust chamber 66, the passage 68 and exhaust port 70.

The control diaphragm 74 is illustrated in the drawing in the position which it would partake when pressure from the brake valve has just been admitted to the inlet port 12 whereupon the diaphragm 74 is moved clear of a stop 86 on the upper wall of the chamber 80 and when the diaphragm is in engagement with this stop, which is its normal brake released position, it will be seen that the lower end of the exhaust passage 64 is freely opened to atmosphere by way of the route set forth above whereupon the control cavity 46 is at atmospheric pressure so that there is no obstacle in the way of the exhaust valve 20 being moved to its fully open position irrespective of the position of the exhaust valve seat 22.

In accordance with the invention the spring 76 is selected so that only a very low brake valve pressure, preferably less than 5 p.s.i., is required to operate on the diaphragm 74 and move the valve 52 to open position whereupon the control pressure is promptly and fully admitted to the added area chamber 44 before the pressure at the inlet port 12 has built up to the pressure normally required to close the exhaust valve and open the inlet valve, the pressure in the cavity 46 promptly acting on the added area piston 43 to create the identical effect as would be created if the control pressure were at all times present in the added area cavity 46.

From the foregoing, it will be seen that by the use of the control valve 52 to admit control pressure to the cavity 46 at the same time as brake valve pressure is admitted to the inlet port 12 so as to permit the control pressure to act slightly ahead of the brake valve pressure, and, upon brake release, exhausting all pressure from the added area chamber, all of the advantages of prior art proportioning valves are retained while any problems attendant upon trapping or delayed releasing of a low pressure in the brake chamber are entirely eliminated.

What is claimed is:
1. In a variable brake pressure proportioning valve responsive to vehicle load for controlling the application of fluid pressure from an inlet to an outlet and thence to a brake chamber via a differential pressure-responsive member having a changeable ratio of its effective motive areas and including integrally connected inlet and exhaust valves, said member having a constant effective motive area subjected to the pressure at said inlet and a variable effective area subjected on one side to the pressure at said outlet, said member being movable in a brake-applying direction upon increase in pressure on said constant area above a predetermined level and in a brake releasing direction upon decrease of pressure below a predetermined level, and an added effective motive area of constant size carried by said member independently of said first constant effective motive area, the invention which comprises a normally closed control valve for controlling the flow of fluid pressure from a control port to said added area to exert a force thereon in a brake applying direction, a normally open exhaust valve for controlling the flow of fluid pressure from said added area to atmosphere, pressure responsive means for closing said exhaust valve and opening said control valve in response to a predetermined low pressure, and fluid conduit means connecting said fluid pressure responsive means to the inlet of said proportional pressure valve whereby said control valve is retained open and said exhaust valve closed so long as the pressure at said inlet is above said predetermined low level.

2. The proportioning valve of claim 1 wherein said pressure responsive means comprises a diaphragm, and an operative connection between said diaphragm and said exhaust and control valves whereby when said inlet pressure is above said predetermined low value it acts on said diaphragm to close said exhaust valve and open said control valve and vice versa when the pressure at said inlet is less than said predetermined low value.

3. The proportioning valve of claim 1 including spring means normally urging said control and exhaust valves toward their respective normally closed and open positions.

4. The proportioning valve of claim 1 including spring means acting at all times on said member to return it to a position wherein said exhaust valve is fully opened and retained open upon decrease of pressure at said inlet port below a predetermined low value.

References Cited
UNITED STATES PATENTS 3,302,982  2/1967  Pekrul _____ 303—60

DUANE A. REGER, *Primary Examiner.*

EUGENE G. BOTZ, *Assistant Examiner.*